US006652002B2

(12) United States Patent
Li et al.

(10) Patent No.: US 6,652,002 B2
(45) Date of Patent: Nov. 25, 2003

(54) CRASH RESPONSIVE ENERGY ABSORBING DEVICE FOR A STEERING COLUMN

(75) Inventors: Xiaoyu Li, Saginaw, MI (US); James Edward Rouleau, Burt, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/272,637

(22) Filed: Oct. 17, 2002

(65) Prior Publication Data

US 2003/0075913 A1 Apr. 24, 2003

Related U.S. Application Data

(60) Provisional application No. 60/343,035, filed on Oct. 19, 2001.

(51) Int. Cl.[7] .................................................. B62D 1/19
(52) U.S. Cl. ........................................ 280/777; 188/374
(58) Field of Search ........................... 280/777; 74/492, 74/493; 188/374

(56) References Cited

U.S. PATENT DOCUMENTS

| 3,392,599 | A | * | 7/1968 | White | 74/492 |
|---|---|---|---|---|---|
| 4,886,295 | A | * | 12/1989 | Browne | 280/777 |
| 5,040,646 | A | * | 8/1991 | Drefahl | 188/371 |
| 5,788,278 | A | * | 8/1998 | Thomas et al. | 280/777 |
| 5,820,163 | A | * | 10/1998 | Thacker et al. | 280/775 |
| 6,170,874 | B1 | * | 1/2001 | Fosse | 280/777 |
| 6,189,929 | B1 | * | 2/2001 | Struble et al. | 280/777 |
| 6,189,941 | B1 | * | 2/2001 | Nohr | 293/118 |
| 6,234,528 | B1 | * | 5/2001 | Ben-Rhouma et al. | 280/777 |
| 6,322,103 | B1 | * | 11/2001 | Li et al. | 280/777 |
| 6,375,220 | B1 | * | 4/2002 | Kamm | 280/777 |
| 6,378,903 | B1 | * | 4/2002 | Yabutsuka et al. | 280/777 |

* cited by examiner

Primary Examiner—Paul N. Dickson
Assistant Examiner—Laura B. Rosenberg
(74) Attorney, Agent, or Firm—Michael D. Smith

(57) ABSTRACT

An energy absorbing device for a collapsible steering column has a plastically deformable strap extending along a track in a base. When the steering column collapses in a collision, the strap moves along the track and a portion of the strap is displaced by a ball in a pocket in the track, which resists strap movement in an amount related to the diameter of the ball. Different diameter balls are provided. One ball is selected depending on the amount of resistance desired. The ball is selected by an actuator operable by a signal generated by a controller in response to a vehicle collision. Alternatively, an anvil displaces a portion of the strap into a U-shape to resist linear movement of the strap. The position of the anvil is adjustable by a stepped adjuster bar to vary the displacement of the U-shaped portion.

16 Claims, 8 Drawing Sheets

CRASH RESPONSIVE ENERGY ABSORBING DEVICE FOR A STEERING COLUMN

This application claims the benefit of U.S. Provisional Application No.: Application No. 60/343,035 filing date Oct. 19, 2001.

REFERENCE TO RELATED APPLICATION

This application claims the benefit of U.S. Provisional Application No. 60/343,035 filed Oct. 19, 2001.

TECHNICAL FIELD

This application relates generally to steering columns and more particularly to a crash responsive energy absorbing device for a steering column.

BACKGROUND OF THE INVENTION

Many steering column assemblies today are equipped with kinetic energy absorption devices to reduce the likelihood of injury in case of an accident. Such devices come in many different forms. One form that is particularly effective in absorbing significant quantities of energy in a relatively small amount of space employs a plastically deformable member such as a metal strap which is bent over a displacement member such as an anvil. In the event of a head-on collision, the strap is drawn across the anvil and causes a reaction force resisting collapse of the steering column and absorbing energy.

Typically energy absorbing devices, such as those employing a plastically deformable strap, are designed to protect drivers of average weight in a collision of average severity, without taking into account the fact that all drivers are not of average weight and that collisions vary considerably in severity depending on vehicle speed at the time of the impact.

SUMMARY OF THE INVENTION

In accordance with the present invention, it is possible to vary the reaction force resisting collapse of the steering column. For example, the energy absorbing device of this invention may provide a smaller amount of resistance in the case of a less severe collision or a driver of less than average weight, or a greater amount of resistance in the case of a more severe collision or a driver of more than average weight.

The resistance to steering column collapse is preferably provided by a plastically deformable strap. In one form of this invention, the strap is drawn across a supporting track when the steering column collapses. A displacement member displaces a portion of the strap as it moves along the track to impose a reaction force and absorb energy. More specifically, the displacement member is in the form of a ball located in a pocket on the strap-supporting surface of the track.

In a preferred form of the invention, not only one but a plurality of balls of differing diameter are provided, with an actuator for moving one of the balls into position to serve as the displacement member. The greater the diameter of the ball, the greater the deformation of the strap and thus the greater the amount of energy absorbed by the strap when the steering column collapses. A smaller diameter ball will result in less deformation of the strap and thus less energy absorption.

A controller is provided to monitor and detect such conditions as vehicle speed, driver weight, driver seat position and whether or not the driver is belted, and with that information determine how much energy is desired to be absorbed and accordingly how much resistance to strap movement is required and therefore which of the balls is to be selected as the displacement member. The actuator is operated by a signal from the controller through a fast-acting solenoid or pyrotechnic device which will operate the actuator in only milliseconds after the signal is received.

In another form of the invention, the strap has a laterally displaced curved portion of generally U-shape into which an anvil extends. The curved portion of the strap is displaced a predetermined distance depending on the laterally adjusted position of the anvil. When the strap is moved across the anvil, the U-shape travels along the length of the strap to absorb energy. The magnitude of the resistance to movement of the strap across the anvil is dependent upon the laterally displaced position of the U-shaped portion of the strap and that is determined by the laterally adjusted position of the anvil. The anvil is laterally adjusted by an actuator which responds to a signal from a controller which monitors the conditions previously referred to.

One object of this invention is to provide an energy absorbing device having the foregoing features and capabilities.

Other objects, features and advantages of the invention will become more apparent as this description proceeds.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1A:
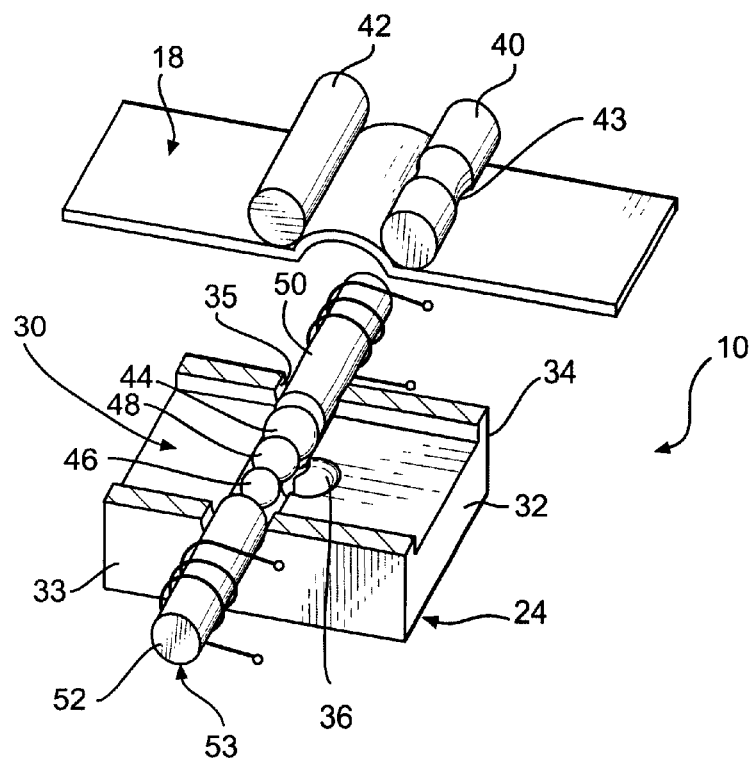
FIG. 1A is an exploded perspective view, with parts in section, of portions of an energy absorbing device for use in the steering column assembly shown in FIGS. 3 and 4.

Referring now more particularly to the drawings and especially to FIGS. 1A, 1B, 2, 3 and 4, an energy absorbing device 10 is shown for use with a steering column assembly 12 that includes a collapsible upper steering column 14 and a lower steering column 16 telescoped within the upper steering column.

The energy absorbing device 10 includes an elongated, plastically deformable metal strap 18 having one end secured by a stationary pin 20 to vehicle support structure. The energy absorbing device 10 also includes a base 24 which is mounted on a bracket 26 secured to the collapsible upper steering column 14 so that the base 24 moves with the steering column 14 when the steering column collapses.

The base 24 has a track 30 which extends lengthwise of the collapsible steering column 14. The track 30 has a bottom surface 32 on which the strap 18 is supported. The base 24 has laterally spaced side walls 33 and 34 extending outwardly from the track 30 on opposite sides thereof The bottom surface 32 of the base 24 has a transverse channel 35 which is perpendicular to the strap 18 and open ended and extends from one side of the base 24 to the other. A recess or pocket 36 in the bottom surface 32 communicates with the channel 35 at the midpoint in the length of the channel. The bottom of the pocket 36 provides a ramp 37 which cuts through a side wall of the channel and extends from the channel to the bottom surface 32 at an acute angle.

The strap 18 is held down on the bottom surface 32 of the track by reaction members including a pair of spaced apart, parallel rollers 40 and 42 which extend perpendicular to the strap and are rotatably supported in the side walls 33 and 34 of the base 24. The rollers 40 and 42 are on opposite sides of the channel 35 in the base 24. The roller 40 has a neck portion 43 of reduced diameter directly opposite the pocket 36.

Displacement members in the form of balls 44, 46 and 48 of relatively large, small and intermediate diameter, are supported in a row in the channel 35. All of the balls are large enough to project above the surface 32 into frictional contact with the strap 18. An axially slidable plunger 50 extends lengthwise within the channel 35 at one end of the row of balls. An axially slidable plunger 52 extends lengthwise within the channel 35 at the opposite end of the row of balls. The plungers 50 and 52 extend, through holes 51 in the side walls 33 and 34. The plungers 50 and 52 together provide an actuator 53 for moving the balls one way or the other in the channel to align a selected ball with the pocket 36.

Figure 1B:
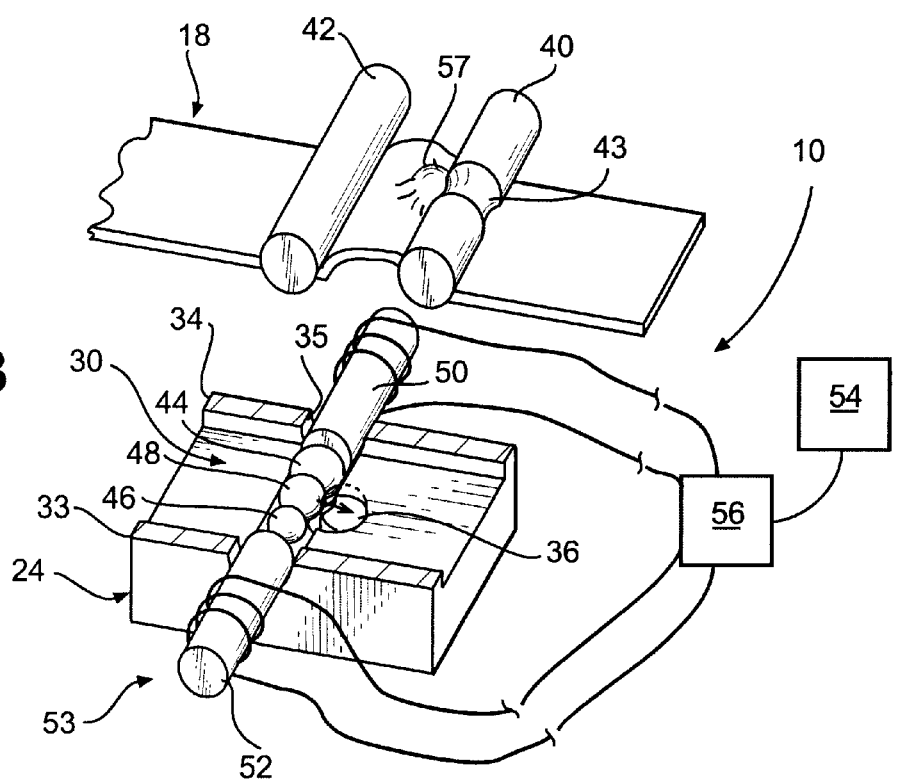
FIG. 1B is a view similar to FIG. 1A but with the parts in a different position.
Figure 2:
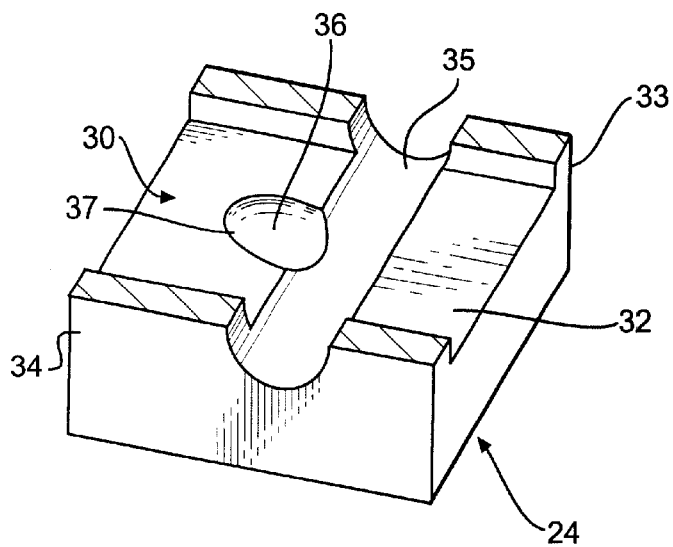
FIG. 2 is a perspective view, with parts in section, of a portion of a base forming part of the energy absorbing device.
Figure 6:
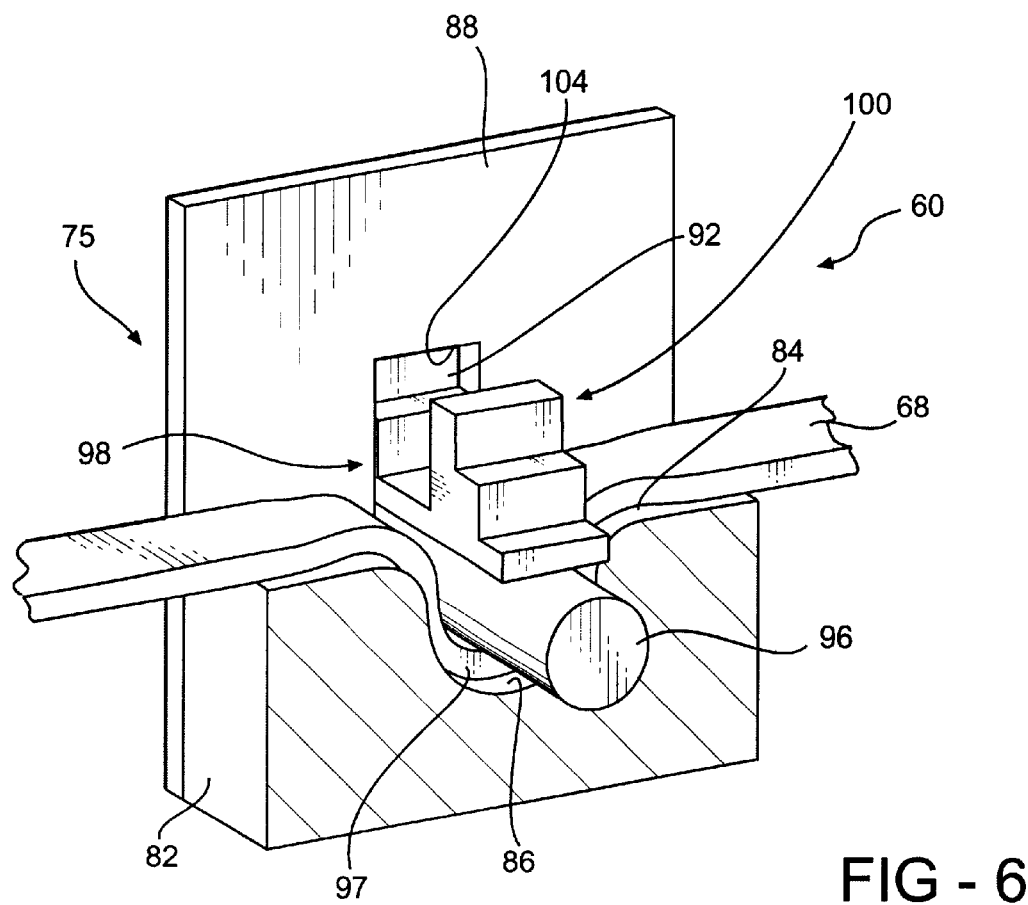
FIG. 6 is a perspective view with parts broken away of the energy absorbing device shown in FIGS. 5A and 5B.
Figure 3:
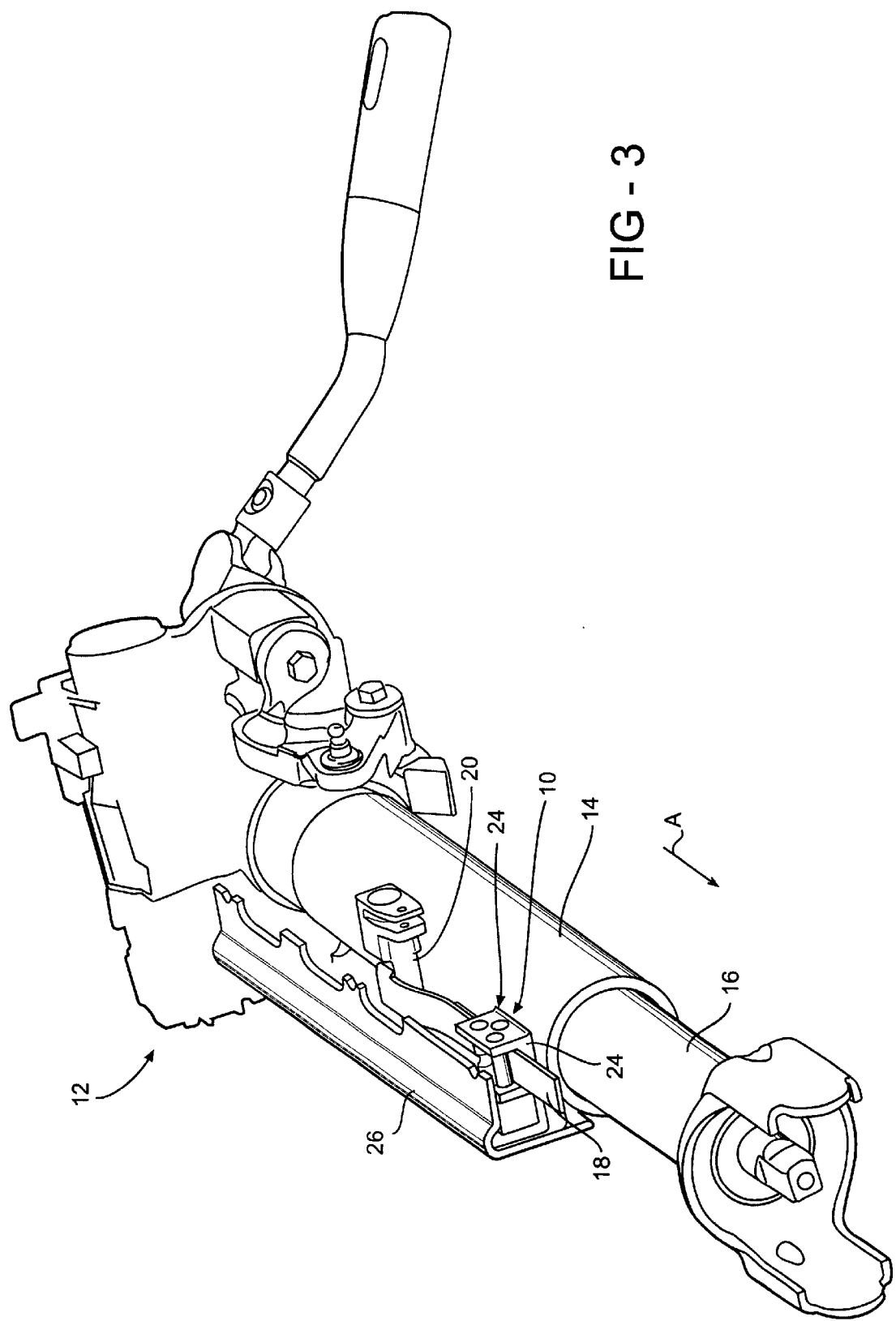
FIG. 3 is a perspective view of a steering column assembly having the energy absorbing device of FIGS. 1A and 1B and FIG. 2.
Figure 4:
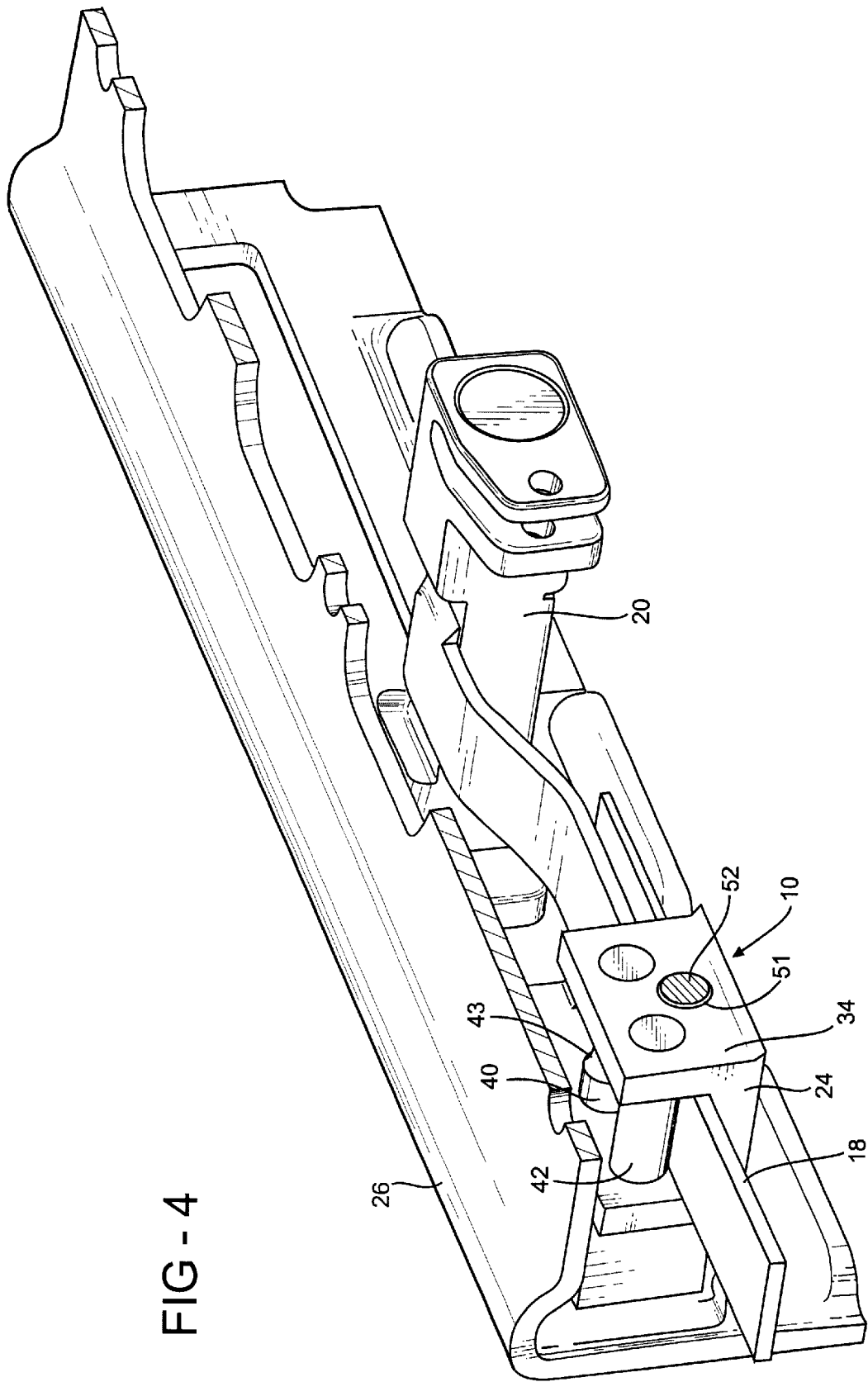
FIG. 4 is an enlarged perspective view of a portion of the steering column assembly shown in FIG. 3.

At the time of a crash or head-on collision in which the column 14 collapses, conditions such as vehicle speed, driver seat position, etc., are monitored and detected by a computer or controller 54. Based on these conditions, the controller 54 determines how much resistance to strap movement is needed to absorb energy and reduce the risk of serious injury to the driver, and transmits an appropriate signal to a fast-acting device 56, in this instance a solenoid, which in turn axially moves the plungers 50 and 52 one way or the other to align one of the balls (in FIG. 1B, the ball 48) with the pocket 36. A solenoid or a polytechnic device is usually selected to move the plungers 50 and 52 because they are fast-acting and provide a very quick response (less than 10 milliseconds). The strap 18 advances relative to the base 24 when the steering column 14 collapses, and during such advance rolls the aligned ball 48 by frictional contact therewith into the pocket 36 and up the inclined ramp 37 of the pocket 36 where the ball is wedged between the strap and the pocket and serves as a displacement member to displace a portion 57 (see FIG. 1B) of the strap 28 out of the plane of the strap 18 and thereby impose a measured amount of resistance to such advance. This in turn absorbs energy. A larger diameter ball will result in a greater distortion of deformation of the strap, and have a greater resistance to the linear advance of the strap. A smaller diameter ball will produce less distortion of the strap and less resistance to linear advance of the strap. The neck portion 43 of the roller 40 accommodates the displaced portion 57 of the strap as seen in FIG. 1B.

Referring now to FIGS. 5A, 5B and 6–9, an energy absorbing device 60 is provided for use with a steering column assembly 62 which includes an upper steering column 64 and a lower steering column 66 telescoped within the upper steering column 64.

Figure 7:
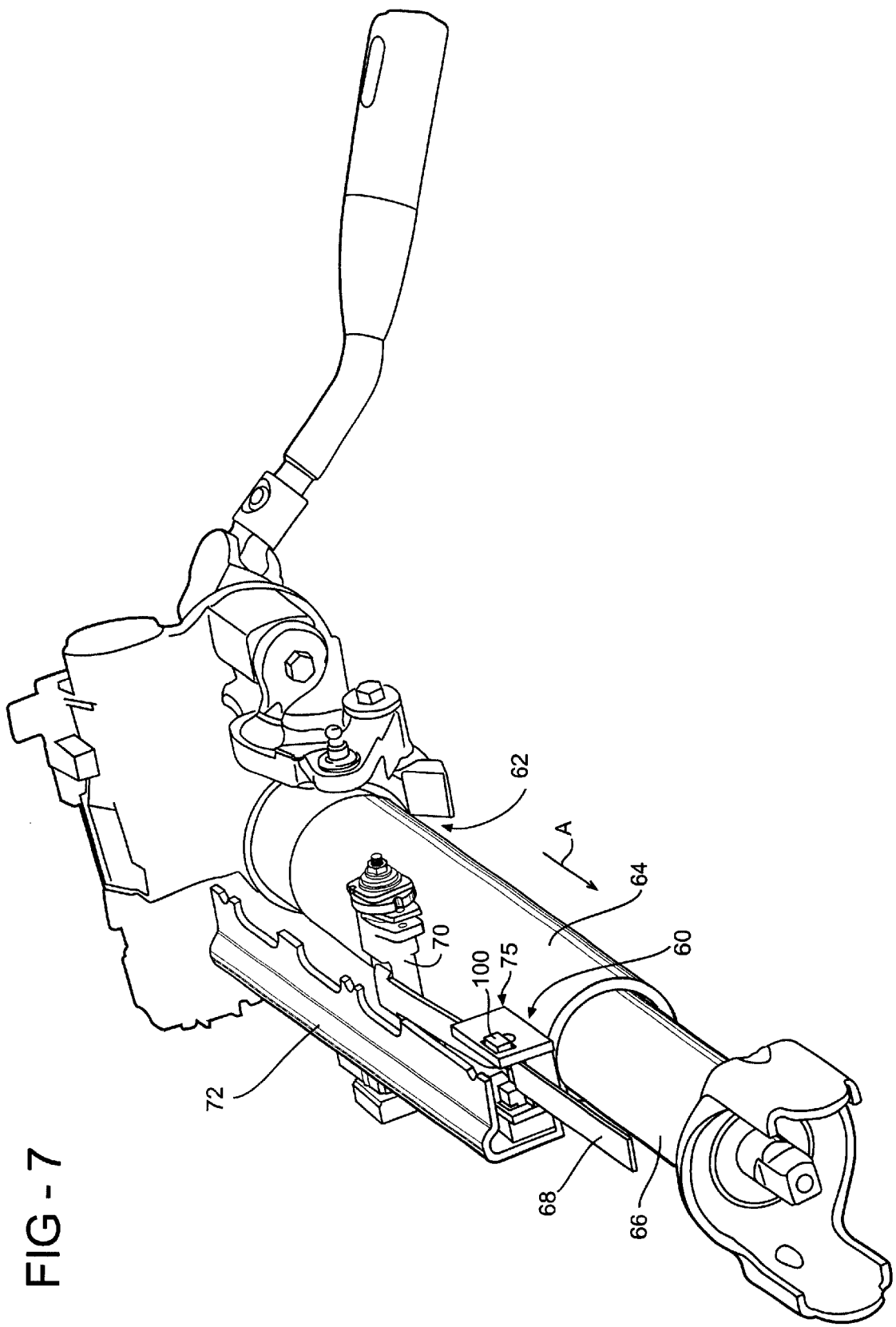
FIG. 7 is a perspective view of a steering column assembly incorporating the energy absorbing device of FIGS. 5A, 5B and FIG. 6.
Figure 8:
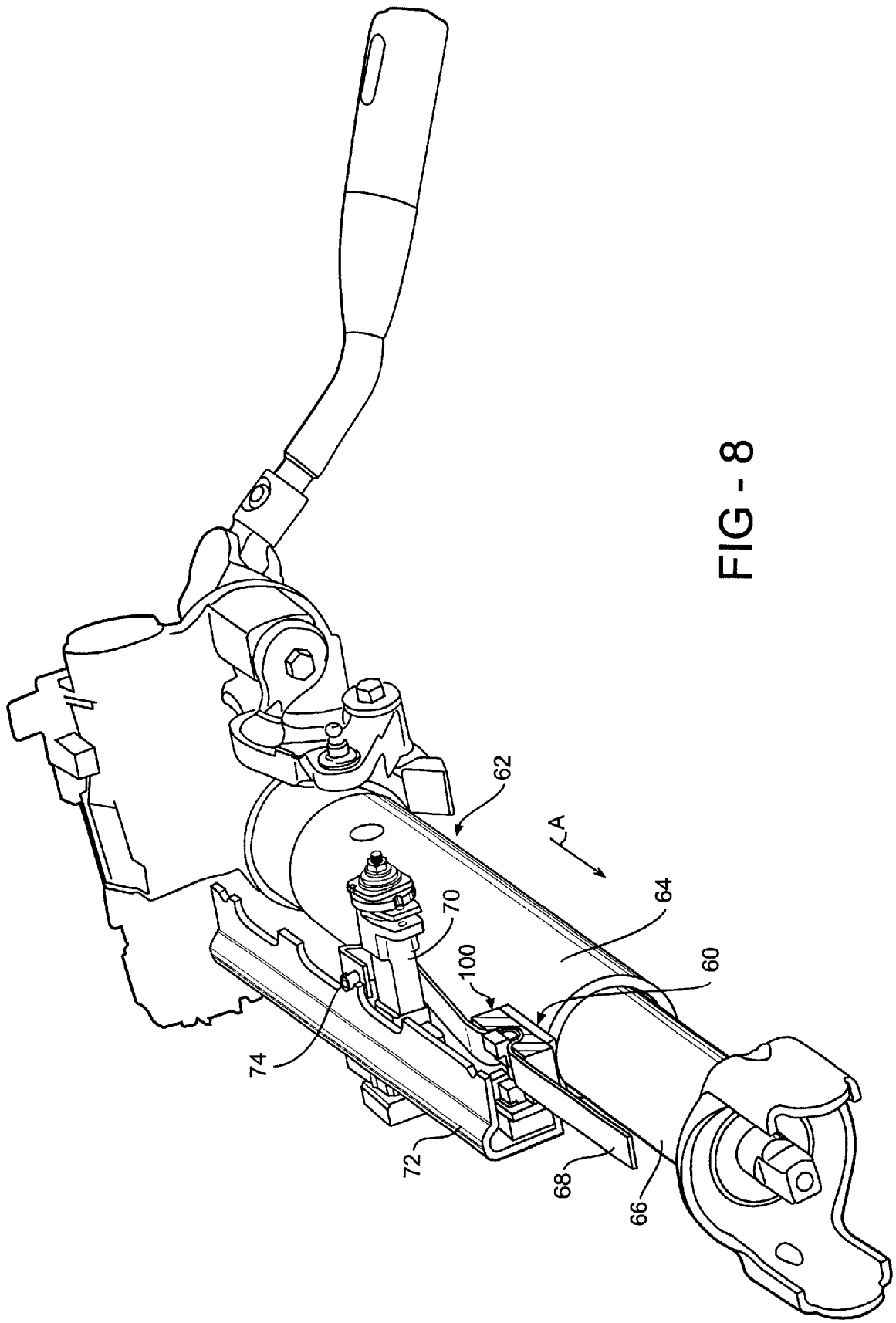
FIG. 8 is a view similar to FIG. 7 but with parts broken away and a different attachment for a fixed end of the strap.
Figure 9:
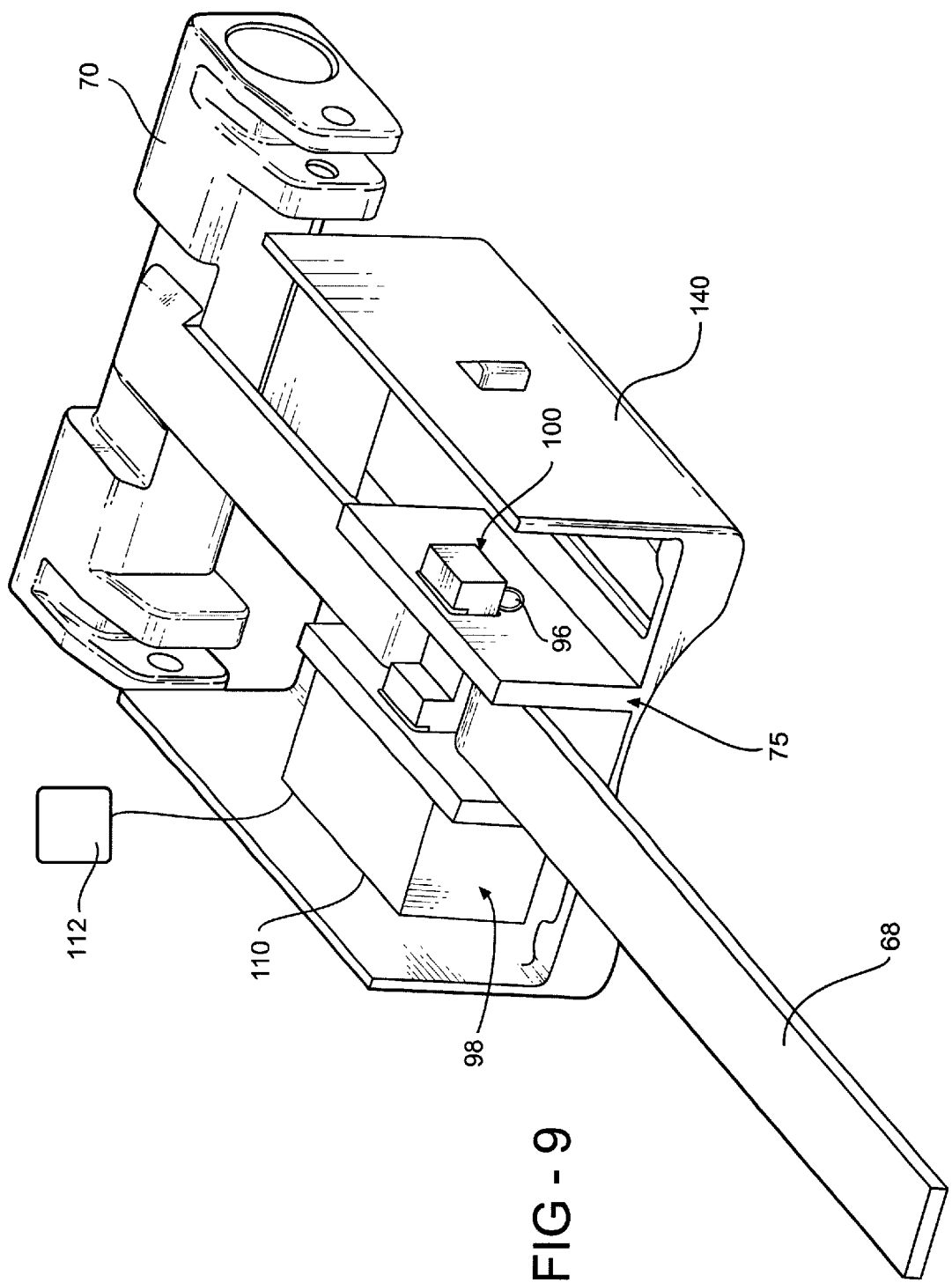
FIG. 9 is an enlarged perspective view of the energy absorbing device, showing a modified attachment of the device to the steering column.

The energy absorbing device 60 includes an elongated, plastically deformable metal strap 68 which has one end secured to an anvil structure 70 fixed to stationary vehicle support structure 72 (FIGS. 7 and 9). Alternatively, the end of the strap extends around the anvil structure 70 and is secured to the vehicle support structure 72 by a bolt 74 (FIG. 8). The strap 68 passes through a housing 75 of the energy absorbing device 60. The housing 75 is secured to the upper steering column 64. Collapsing movement of the column 64 in the direction of the arrow A moves the housing 75 of the energy absorbing device 60 in the same direction relative to the strap, causing the strap to be drawn through the housing 75.

The housing 75 of the energy absorbing device has a center section 82 provided with a top surface 84 formed with a U-shaped trough 86, and laterally spaced apart, side walls 88 and 90 on opposite sides of the center section 82 extending upwardly above the top surface 84. The strap 68 passes over the top surface 84 between the side walls 88 and 90. The side walls 88 and 90 have transversely aligned windows 92 and 94. A floating anvil 96 in the form of a cylindrical pin extends through the windows and across the U-shaped trough 86 in the top surface 84. The anvil 96 extends crosswise of the strap and presses down on the strap 68 and constrains a portion 97 of the strap to be displaced laterally downwardly into the trough 86 to assume a U-shape as shown. The amount of lateral displacement of the U-shaped portion 97 of the strap is determined by the position of the anvil 96. The greater the lateral displacement of the U-shaped portion 97, the greater the amount of resistance to linear movement of the strap.

An actuator 98 is provided for laterally adjusting the position of the anvil 96. The actuator 98 comprises a stepped axially shiftable adjuster bar 100. The bar 100 extends through the windows 92 and 94 of the side wall 88 and 90 parallel to the anvil 96. The bar 100 is on the opposite side of the anvil 96 from the U-shaped portion 97 of the strap. As seen in FIG. 5B, the bar 100 has a pair of spaced apart stepped portions A, a second pair of spaced apart stepped portions B, and a third pair of spaced apart stepped portions C. The stepped portions have coplanar inner surfaces which together define the inner surface 102 of the bar that engages the anvil. The pair of stepped portions A have outer step surfaces A1, A2, located the same distance from the inner surface 102 of the bar 100, the pair of stepped portions B have outer step surfaces B1, B2, located the same but a lesser distance from the inner surface 102 of the bar 100, and the pair of stepped portions C have outer step surfaces C1, C2 located the same but a still lesser distance from the inner surface 102 of the bar 100. The step surfaces A1, A2 are spaced apart the same distance as the side walls 88 and 90 of the housing 75, as are the step surfaces B1, B2 and the step surfaces C1, C2.

The windows 92 and 94 have transversely aligned outer edges 104 which are simultaneously engaged by the outer stepped surfaces A1, A2 or the outer stepped surfaces B1, B2 or the outer stepped surfaces C1, C2 depending on the axial position of the actuator bar 100.

When it is desired to cause the anvil 96 to be displaced a relatively large distance into trough 86 to form a relatively deep U-shape in the U-shaped portion 97 in the strap, the bar is shifted axially so that the outer step surfaces A1, A2 engage the outer edges 104 of the windows 92 and 94. When it is desired to shift the anvil 96 a lesser distance to form the U-shaped portion 97 to a lesser depth, the bar 100 is shifted so that the outer step surfaces B1, B2 engage the outer edges 104 of the windows. When it is desired to minimize the extent to which the anvil 96 is displaced, the bar is shifted so that the outer step surfaces C1, C2 engage the outer edges 104 of the windows.

Figure 5A:
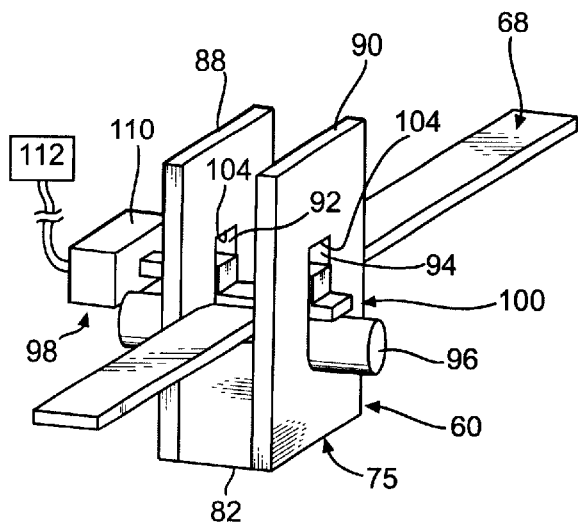
FIG. 5A is a perspective view of an energy absorbing device of modified construction having an adjuster for positioning an anvil, used with the steering column assembly shown in FIGS. 7 and 8.
Figure 5B:
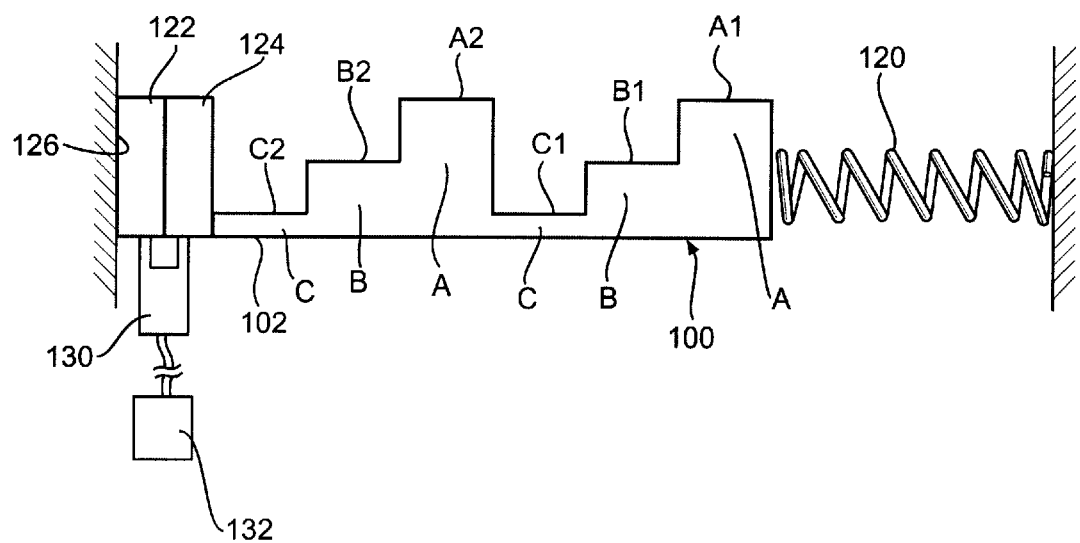
FIG. 5B is a fragmentary elevational view of parts of the energy absorbing device shown in FIG. 5A but with a different arrangement for operating the adjuster.

Referring to FIG. 5A, the bar 100 is shifted axially by a fast-acting device 110, in this instance a solenoid. Once a collision is detected, a signal will be sent to the solenoid from the vehicle body computer or controller 112 which combines all crash information previously referred to and according to the signal received, the solenoid will correspondingly shift the actuator bar 100 to properly position the anvil 96 to adjust the resistance to linear movement of the strap 68 as the strap moves with the collapsing steering column. Instead of a solenoid, the device 110 may be a pyrotechnic device.

FIG. 5B shows a different arrangement for axially shifting the adjuster bar 100. As there is shown, the bar 100 is held by a compression spring 120 in an initial position against two spacers 122 and 124 between an end of the bar 100 and a fixed abutment 126. A solenoid 130 or similar fast-acting device is capable of punching away one or both of the spacers in response to a signal from a controller 132 which, like the controller 112, combines all of the crash information previously mentioned to create the signal. If no spacer is removed, the bar 100 remains in its initial position in which the step surfaces C1, C2 are aligned with and engage the outer edge 104 of the windows 92 and 94. If one of the spacers 122, 124 is removed, the spring 120 moves the bar 100 so that the step surfaces B1, B2 engage the outer edges 104 of the windows. If both spacers are removed, the spring moves the bar 100 so that the step surfaces A1, A2 engage the outer edges of the windows.

FIG. 9 is an enlarged view of a portion of FIG. 8 showing a special mounting bracket 140 for securing the housing 75 to the collapsible steering column 64.

What is claimed is:

1. An energy absorbing device for a collapsible steering column of a vehicle, comprising:
   an elongated, plastically deformable strap for resisting the collapse of the steering column in a vehicle collision,
   a base having a track provided with a surface for supporting the strap,
   a pocket in the surface of said track,
   means for relatively moving said strap and said base in a direction causing said strap to linearly traverse said pocket when the steering column collapses,
   reaction members spaced apart in the direction of relative movement of said strap and said base and positioned on opposite sides of the pocket for holding the strap on said track during such relative movement, and
   a displacement member in said pocket projecting above the surface of said track to displace a portion of said strap between said reaction members away from the surface of said track to resist such relative movement of the strap and base and thereby absorb energy.

2. The energy absorbing device of claim 1, wherein said reaction members include rollers extending transversely of the strap, one of said rollers having a reduced neck portion to accommodate the displaced portion of said strap.

3. The energy absorbing device of claim 1, wherein said pocket includes a ramp leading up to the surface of said track, and said displacement member is a ball urged by the relative movement of said strap and said base to roll up said ramp and to be wedged between the ramp and the strap to effect the displacement of said portion of the strap.

4. The energy absorbing device of claim 3, wherein said reaction members include rollers extending transversely of the strap, one of said rollers having a reduced neck portion directly opposite said pocket to accommodate the displaced portion of said strap.

5. The energy absorbing device of claim 1, wherein said pocket includes a ramp leading to the surface of said track, said base has a channel in the surface of said track communicating with said pocket, said displacement member is a selected one of a plurality of balls of differing diameters in said channel, and an actuator operable to move the selected one of said balls into alignment with said pocket, said selected one of said balls being urged by the relative movement of said strap and said base to roll into said pocket and up said ramp to be wedged between the ramp and the strap to effect the displacement of said portion of the strap.

6. The energy absorbing device of claim 5, wherein said reaction members include rollers extending transversely of the strap, one of said rollers having a reduced neck portion directly opposite said pocket to accommodate the displaced portion of said strap.

7. The energy absorbing device of claim 6, wherein said actuator is operable by a signal generated by a controller in response to the vehicle collision.

8. The energy absorbing device of claim 7, wherein said actuator includes a plunger reciprocable in said channel.

9. The energy absorbing device of claim 8, wherein said actuator includes a solenoid for receiving said signal and activating said plunger.

10. The energy absorbing device of claim 8, wherein said actuator includes a pyrotechnic device for receiving said signal and activating said plunger.

11. An energy absorbing device for a collapsible steering column of a vehicle comprising:
    an elongated, plastically deformable strap including a laterally displaced portion having a generally U-shape,
    an anvil extending transversely of the strap and disposed in the laterally displaced portion of the strap,
    an actuator for laterally adjusting the position of the anvil,
    said anvil maintaining the laterally displaced portion of the strap laterally displaced a predetermined distance depending on the laterally adjusted position of the anvil, and
    means for relatively moving said strap and said anvil to cause said strap to laterally traverse said anvil and the U-shape to travel lengthwise along the strap when the steering column collapses,
    the laterally displaced portion of said strap resisting the relative movement of the strap and the anvil, the magnitude of such resistance being dependent upon the lateral displacement of the laterally displaced portion of the strap as determined by the laterally adjusted position of the anvil,
    wherein said actuator comprises an elongated adjuster bar axially shiftable between a first stop and a second stop and having first and second pairs of axially spaced stepped portions, said stepped portions having coplanar surfaces which together define an inner surface of said bar engagable with said anvil, said first pair of stepped portions having first outer step surfaces spaced a first distance from said inner surface, said second pair of stepped portions having second outer step surfaces spaced a second distance from said inner surface, a housing having spaced apart side walls straddling said strap, said side walls having aligned windows through which said bar extends, said windows having outer edges, said first outer stop surfaces being engagable with the respective outer edges of the windows at the first stop of the bar and the second outer stop surfaces being engagable with the respective outer edges of the windows at the second stop of the bar, said anvil being held in its first position by said bar when said bar is at the first stop and being held in its second position by paid bar when said bar is at the second stop, and an actuator for shifting the bar between said first and second stops.

12. The energy absorbing device of claim 11, wherein said bar is shifted axially by a signal generated by a controller in response to a vehicle collision.

13. The energy absorbing device of claim 12, wherein said actuator comprises a solenoid for receiving said signal and shifting said bar.

14. The energy absorbing device of claim 12, wherein said actuator comprises a pyrotechnic device for receiving the signal and shifting said bar.

15. An energy absorbing device for a collapsible steering column of a vehicle comprising:

an elongated, plastically deformable strap including a laterally displaced portion having a generally U-shape, an anvil extending transversely of the strap and disposed in the laterally displaced portion of the strap, an actuator for laterally adjusting the position of the anvil, including an adjuster bar formed separately from and engageable with said anvil and movable between a first stop and a second stop, at the first stop said adjusting bar holding said anvil in a first position and at the second stop said bar holding said anvil in a second position;

said anvil maintaining the laterally displaced portion of the strap laterally displaced a predetermined distance depending on the laterally adjusted position of the anvil; and the laterally displaced portion of said strap resisting relative movement of the strap and the anvil, in response to collapse of the steering column, the magnitude of such resistance being dependent upon the lateral displacement of the laterally displace portion of the strap as determined by the laterally adjusted position of the anvil.

16. The energy absorbing device of claim 15, wherein said adjuster bar comprises a stepped adjuster bar which is shiftable between the first stop and the second stop, said bar having a plurality of stepped portions that are engageable with said anvil to locate said anvil in either of the two different positions depending whether the bar is at said first stop or said second stop.

* * * * *